(12) United States Patent
Yehuday

(10) Patent No.: US 10,109,182 B1
(45) Date of Patent: Oct. 23, 2018

(54) VOICE COMMAND CONVERSION

(71) Applicant: DSP Group Ltd., Herzeliya (IL)

(72) Inventor: Uri Yehuday, Holon (IL)

(73) Assignee: DSP GROUP LTD., Herzeliya (IL)

(*) Notice: Subject to any disclaimer, the term of this patent is extended or adjusted under 35 U.S.C. 154(b) by 0 days.

(21) Appl. No.: 15/652,338

(22) Filed: Jul. 18, 2017

Related U.S. Application Data

(60) Provisional application No. 62/364,388, filed on Jul. 20, 2016.

(51) Int. Cl.
| | |
|---|---|
| *G08C 23/02* | (2006.01) |
| *G10L 15/22* | (2006.01) |
| *G10L 15/28* | (2013.01) |
| *G10L 21/0232* | (2013.01) |

(52) U.S. Cl.
CPC ............. *G08C 23/02* (2013.01); *G10L 15/22* (2013.01); *G10L 15/28* (2013.01); *G10L 21/0232* (2013.01); *G10L 2015/223* (2013.01)

(58) Field of Classification Search
CPC ......... G10L 15/26; G10L 15/22; G10L 17/26; G10L 2015/223; G10L 13/047; G10L 15/00; G10L 15/02; G10L 15/04
USPC .......................................... 367/198
See application file for complete search history.

(56) References Cited

U.S. PATENT DOCUMENTS

| | | | | |
|---|---|---|---|---|
| 5,255,341 | A * | 10/1993 | Nakajima | B66B 1/468 340/573.1 |
| 7,260,538 | B2 * | 8/2007 | Calderone | 348/14.05 |
| 2012/0134507 | A1 * | 5/2012 | Dimitriadis | H04R 3/00 381/92 |
| 2017/0213569 | A1 * | 7/2017 | Jang | G10L 25/78 |

* cited by examiner

*Primary Examiner* — Mark Blouin
(74) *Attorney, Agent, or Firm* — Reches Patents

(57) ABSTRACT

A method and a system for voice command conversion, the system may include one or more microphones for sensing a voice command for controlling an acoustically controlled device; one or more speech recognition units for identifying the voice command; an ultrasonic command generator for generating an ultrasonic command that represents the voice command; and one or more speakers for transmitting the ultrasonic command to the acoustically controlled device.

32 Claims, 13 Drawing Sheets

VOICE COMMAND CONVERSION

CROSS REFERENCE

This application claims the priority of U.S. provisional patent Ser. No. 62/364,388 filing date Jul. 20, 2016 which is incorporated herein by reference.

BACKGROUND OF THE INVENTION

In the Internet of Things (IoT) future, many devices are designed to work using voice commands.

These devices (also referred to as voice control device) may be equipped with (a) one or more microphones that detect sound signals, and (b) a processor for applying a speech recognition process on the detected sound signals to detect the voice commands.

The one or more microphones may be attached to the body of a voice control device.

A voice control device (VCD) may operate in a noisy environment. The noise may be generated by the acoustically controlled device (for example—when the acoustically controlled device is a vacuum cleaner, a speaker, or a device that includes a noisy engine) or by other devices or other people.

The speech recognition process may not operate under certain noisy conditions. For example—the speech recognition process may not recognize a voice command when the signal to noise ratio (SNR) is not high enough.

There is a growing need to provide a system and method for allowing to control acoustically controlled device s in a noisy environment.

SUMMARY

There may be provided a system for voice command conversion, the system may include: one or more microphones for sensing a voice command for controlling an acoustically controlled device; one or more speech recognition units for identifying the voice command; an ultrasonic command generator for generating an ultrasonic command that represents the voice command; and one or more speakers for transmitting the ultrasonic command to the acoustically controlled device. The acoustically controlled device is a device that may be controlled by acoustic signals. Acoustic signals may include voice signals and/or ultrasonic signals. The acoustically controlled device may be a voice controlled device that may be controlled only by voice commands.

The system may include one or more communication modules for communicating between the one or more microphones and the one or more speech recognition and for communicating between the ultrasonic command generator and the one or more speakers.

The ultrasonic generator may be configured to generate the ultrasonic command by frequency up-conversion of the voice command.

The ultrasonic generator may be configured to generate the ultrasonic command by searching an ultrasonic command that corresponds to the voice command.

The ultrasonic generator may be configured to generate the ultrasonic command by retrieving from another device the ultrasonic command.

The ultrasonic generator may be configured to generate the ultrasonic command by using a mapping between voice commands and ultrasonic commands.

The system may be configured to evaluate a validity of the voice command and to generate the ultrasonic command only when determining that the voice command may be valid.

The system may be configured to evaluate a validity of the voice command and to generate the ultrasonic command regardless of the validity of the voice command.

The system may be configured to transmit the ultrasonic command only when the acoustically controlled device did not respond to the voice command.

The system may include one or more sensors for tracking a compliance of the acoustically controlled device to the voice command.

The one or more sensors may differ from the one or more microphones.

The one or more sensors may include at least one image sensor.

The one or more sensors may include at least one movement sensor.

The one or more sensors may include at least one microphone from the one or more microphones.

The system may include one or more spectrum analyzers for finding a gap in a spectrum of an actual noise generated by the acoustically controlled device or an expected noise generated by the acoustically controlled device; and wherein the ultrasonic command generator may be configured to select an ultrasonic frequency of ultrasonic command to fall in the gap.

The system may include one or more spectrum analyzers for finding a gap in a spectrum of an actual noise generated by an environment of the system or an expected noise generated by the environment of the system; and wherein the ultrasonic command generator may be configured to select an ultrasonic frequency of ultrasonic command to fall in the gap.

The system may include one or more spectrum analyzers for finding frequency range in a spectrum of noise generated by the acoustically controlled device in which the noise may be below a predefined spectrum; and wherein the ultrasonic command generator may be configured to select an ultrasonic frequency of ultrasonic command to fall in the frequency range.

The system may include one or more spectrum analyzers for finding frequency range in a spectrum of noise generated by an environment of the system in which the noise may be below a predefined spectrum; and wherein the ultrasonic command generator may be configured to select an ultrasonic frequency of ultrasonic command to fall in the frequency range.

The acoustically controlled device may be a speaker and the system may include a music identifier for identifying music that may be played by the speaker and to determine an ultrasonic frequency of the ultrasonic command based on the music played by the speaker to fit in at least one gap or in frequencies of less spectral content of the music played by the speaker.

There may be provided a method for voice command conversion, the method may include: sensing, by one or more microphones, a voice command for controlling an acoustically controlled device; identifying, by one or more speech recognition units, the voice command; generating, by an ultrasonic command generator, an ultrasonic command that represents the voice command; and transmitting, by one or more speakers, the ultrasonic command to the acoustically controlled device.

The generating of the ultrasonic command may include frequency up-converting of the voice command.

The generating of the ultrasonic command may include searching an ultrasonic command that corresponds to the voice command.

The generating of the ultrasonic command may include retrieving the ultrasonic command from another device.

The generating of the ultrasonic command may include using a mapping between voice commands and ultrasonic commands.

The method may include evaluating a validity of the voice command and generating the ultrasonic command only when determining that the voice command may be valid.

The method may include evaluating a validity of the voice command and generating the ultrasonic command regardless of the validity of the voice command.

The method may include transmitting the ultrasonic command only when the acoustically controlled device did not respond to the voice command.

The method may include tracking by one or more sensors a compliance of the acoustically controlled device to the voice command.

The one or more sensors may differ from the one or more microphones.

The one or more sensors may include at least one image sensor.

The one or more sensors may include at least one movement sensor.

The method may include finding by one or more spectrum analyzers a gap in a spectrum of an actual noise generated by the acoustically controlled device or an expected noise generated by the acoustically controlled device; and selecting by the ultrasonic command generator an ultrasonic frequency of ultrasonic command to fall in the gap.

The method may include finding by one or more spectrum analyzers a gap in a spectrum of an actual noise generated by an environment of the system or an expected noise generated by the environment of the system; and selecting by the ultrasonic command generator an ultrasonic frequency of ultrasonic command to fall in the gap.

The method may include finding by one or more spectrum analyzers for a frequency range in a spectrum of noise generated by the acoustically controlled device in which the noise may be below a predefined spectrum; and selecting an ultrasonic frequency of ultrasonic command to fall in the frequency range.

The method may include finding by one or more spectrum analyzers for a frequency range in a spectrum of noise generated by an environment of the system in which the noise may be below a predefined spectrum; and selecting an ultrasonic frequency of ultrasonic command to fall in the frequency range.

The acoustically controlled device may be a speaker and the method may include identifying, by a music identifier, music that may be played by the speaker and determining an ultrasonic frequency of the ultrasonic command based on the music played by the speaker.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
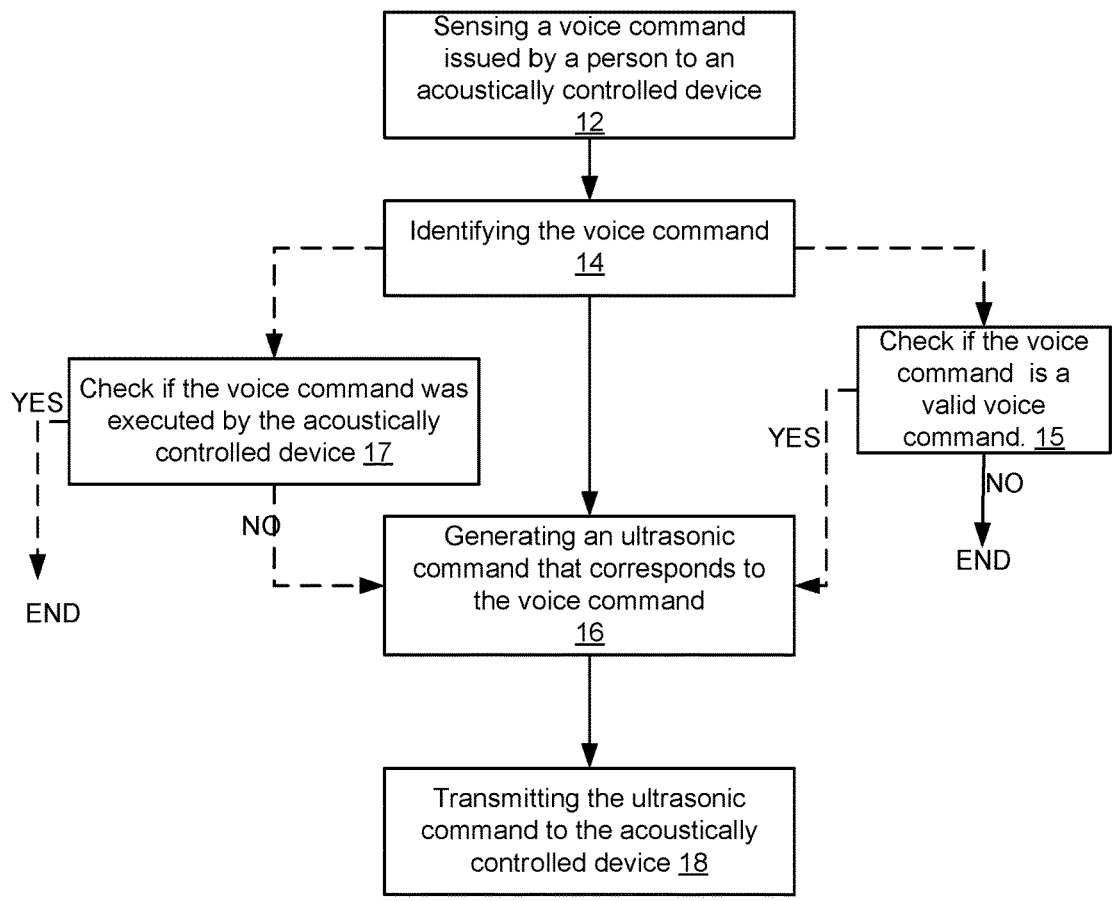
FIG. 1 illustrates a method according to an embodiment of the invention.
Figure 1:
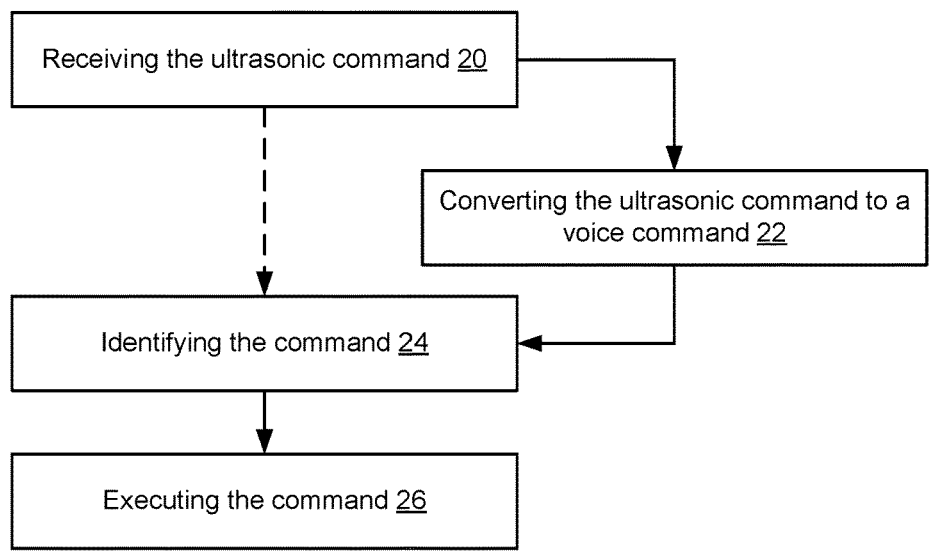

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to an embodiment of the invention there is provided a device, a method and a non-transitory computer readable medium for controlling acoustically controlled device s by converting voice commands issued by a person to ultrasonic commands that still can be sensed by one or more microphones of the acoustically controlled device s.

The ultrasonic frequency may exceed the upper audible limit for human hearing—may exceed 20 Kilohertz.

Although ultrasound devices may operate with frequencies from 20 kHz to several gigahertz—it should be noted that the ultrasonic command should still be detected by the one or more microphones of the acoustically controlled device s. Accordingly—the frequency response of the one or more microphones of the acoustically controlled device s should be taken into account—and may impose an upper limit on the ultrasonic frequency of the ultrasonic command. See, for example, FIG. 13.

According to an embodiment of the invention there is provided a system that may be configured to (a) detect a voice command issued by a person to a acoustically controlled device, (b) generate an ultrasonic command that represents the voice command, and (c) transmit the ultrasonic command to the acoustically controlled device.

The system may include (a) one or more microphones for sensing the voice command, (b) one or more speech recognition units for identifying the voice command, (c) an ultrasonic command generator for generating the ultrasonic command (d) one or more speakers for transmitting the ultrasonic commands, and (e) one or more communication modules for allowing a communication between different components of the system and/or between the system and other devices. A communication module may include a transmitter and/or a receiver and may apply any known communication protocols.

The ultrasonic command represents the voice command in the sense that both represent the same command.

The ultrasonic generator may perform at least one of the following:
  a. Up-convert the voice command to the ultrasonic command by applying frequency conversion.
  b. Fetch from a memory bank of the system (or another device), the corresponding ultrasonic command.
  c. Retrieve from another device the corresponding ultrasonic command. This may include sending information about the voice command to the other device and retrieve information about the ultrasonic command from the other device. This may include communicating (by the system, directly or indirectly) with the other device via any type of wired or wireless communication.

The other device may be a server or other computerized device.

The system may be configured to detect the voice command, check (by itself or by communicating with the other device) that the voice command is a valid voice command (for example—belongs to a given set of voice commands associated with the acoustically controlled device) and if so—generate the ultrasonic command and send the ultrasonic command to the acoustically controlled device. Alternatively—the system may not perform a validity check and/or may convert each voice command to an ultrasonic voice command regardless of its validity.

The system may be configured to generate and/or transmit the ultrasonic command only when the device did not respond to the voice command issued by the person.

The system may determine that the device did not respond to the voice command by detecting that the person repeated the command several times within a short period.

The system may determine that the device did not respond to the voice command by detecting a lack of response from the acoustically controlled device.

A lack of response (or the wrong response) may be detected, for example, when the voice command requests the acoustically controlled device to shut down or otherwise change the noise generated by the device—but the noise generated by the acoustically controlled device does not change.

A lack of response (or the wrong response) may be detected, for example, when the voice command requests the acoustically controlled device to power up—but the acoustically controlled device remains shut down.

A lack of response (or the wrong response) may be detected, for example, when the voice command requests the acoustically controlled device to move (or to stop moving)—and the acoustically controlled device does not move (or does not stop moving). The movement or lack of movement may be detected by a change or a lack of change of the noise generated by the device, may be detected using image sensors or other movement sensors, and the like.

The acoustically controlled device may include a speech recognition circuit that may detect both the voice command and the ultrasonic command.

Additionally or alternatively, the acoustically controlled device may include a converter for converting the ultrasonic command to a voice command that can be processed by the speech recognition circuit.

The different components of the system may be included in one or more intermediate devices that may be used to detect a voice command, generate an ultrasonic command that represents the voice command, and transmit the ultrasonic command to the acoustically controlled device.

An intermediate device may include all or some of the components of the system. For example, an intermediate device may include (a) one or more microphones for sensing the voice command, (b) one or more speech recognition units for identifying the voice command, (c) an ultrasonic command generator for generating the ultrasonic command and (d) one or more speakers for transmitting the ultrasonic commands.

The intermediate device may be included in one of more housing such as a box, or any other shaped housing. The housing may have a substantially cylindrical shaped housing. The intermediate device may be electrically coupled to a power supply plug, may be powered by a battery, or may receive power in any contact or contactless manner.

Alternatively, one or more of the component of the system may be spaced apart from other component of the system.

The system may include one or more microphones (for sensing the voice command) that are spaced apart from the one or more speakers (for transmitting the ultrasonic commands). The one or more speech recognition circuits (for identifying the voice command) may be electrically coupled (wirelessly or not) to the one or more microphones. The ultrasonic command generator (for generating the ultrasonic command) may be electrically coupled (wirelessly or not) to the one or more speakers.

The different components of the system may communicate with each other using any known communication protocol (such as Bluetooth, Wi-Fi, DECT).

The acoustically controlled device may be operated in a certain environment (within a building, within one or more rooms of the building) and the system may include speakers and microphones that are spread along the certain environment.

The system may include one or more sensors for tracking the compliance of the acoustically controlled device to the voice commands issued by the person. The one or more sensors may be the one or more microphones and/or other sensors such as image sensors, movement sensors and the like.

According to an embodiment of the invention the ultrasonic frequency may be selected based on the actual or expected noise generated by the acoustically controlled device.

For example, the noise generated by a acoustically controlled device may be analyzed (by performing spectral analysis) to determine the gaps in the noise spectrum—and/or frequency ranges in which the noise generated by the vacuum cleaner are below a certain threshold. The ultrasonic frequency may be selected to be included one or more in the gaps and/or frequency ranges in which the noise generated by the vacuum cleaner are below a certain threshold. The ultrasonic command can be simultaneously transmitted over multiple gaps and/or multiple such frequency ranges.

According to an embodiment of the invention the acoustically controlled device may be a speaker and the system may include a music identifier for identifying the music that is played by the speaker and to determine the ultrasonic frequency of the ultrasonic command based on the played music—to fit in gaps or frequencies of less spectral content of that music.

FIG. 1 illustrates a method 10 according to an embodiment of the invention. Steps 12, 14, 15, 17, 16 and 18 may be executed by the system while steps 20, 22, 24 and 26 may be executed by the acoustically controlled device.

Method 10 may start by step 12 of sensing (for example by one or more microphones) a voice command issued (for example by a person) to an acoustically controlled device. The voice command is aimed to control the acoustically controlled device.

Step 12 may be followed by step 14 of identifying (for example by one or more speech recognition units) the voice command.

Step 14 may be followed by either one of steps 15, 16 and 17. Out of steps 15, 16 and 17—method 10 may include step 16 and zero or more steps out of steps 15 and 17.

Step 16 may include generating (for example by an ultrasonic command generator) an ultrasonic command that represents the voice command.

The ultrasonic command is transmitted to the acoustically controlled device directly or indirectly (via a relay or other communication unit).

Step 16 may include at least one of the following:
a. Up-converting of the voice command.
b. Searching an ultrasonic command that corresponds to the voice command.
c. Retrieving the ultrasonic command from another device.
d. Using a mapping between voice commands and ultrasonic commands.
e. Using a mapping between voice commands and frequency information and ultrasonic commands.
f. Finding by one or more spectrum analyzers a gap in a spectrum of an actual noise generated by the acoustically controlled device or an expected noise generated by the acoustically controlled device; and selecting an ultrasonic frequency of ultrasonic command to fall in the gap.
g. Finding by one or more spectrum analyzers a gap in a spectrum of an actual noise generated by the environment of the system or an expected noise generated by the environment of the system; and selecting an ultrasonic frequency of ultrasonic command to fall in the gap.
h. Finding by one or more spectrum analyzers for a frequency range in a spectrum of noise (actual or estimated) generated by the acoustically controlled device in which the noise is below a predefined spectrum; and selecting an ultrasonic frequency of ultrasonic command to fall in the frequency range.
i. Finding by one or more spectrum analyzers for a frequency range in a spectrum of noise (actual or estimated) generated by the environment of the system in which the noise is below a predefined spectrum; and selecting an ultrasonic frequency of ultrasonic command to fall in the frequency range.
j. Identifying, by a music identifier, music that is played by the speaker and determining an ultrasonic frequency of the ultrasonic command based on the music played by the speaker.

Step 14 may be followed by step 15 of evaluating a validity of the voice command. Step 15 may include checking if the voice command belongs to a set of voice commands that are associated with the acoustically controlled device. The set of voice commands may be fed to other device or to a system in advance—or may be retrieved or learnt in any other manner. The validity check may check whether the voice command is corrupted or not.

Step 15 may be followed by step 16 only if the voice command is valid—and thus method 10 may include generating the ultrasonic command only when determining that the voice command is valid. Alternatively—step 15 may be followed by step 16 regardless of the validity of the voice command.

Step 14 may be followed by step 17 of checking of the voice command was executed by the acoustically controlled device. This may require the user to issue the voice command several times without having the acoustically controlled device execute the voice command and/or waiting for a predefined delay from the issuing of the voice command without having the acoustically controlled device execute the voice command.

The compliance of the acoustically controlled device may be sensed by one or more sensors such as microphones, motion sensors, image sensors and the like.

Step 17 may be followed by step 16—and method 10 may include transmitting the ultrasonic command only when the acoustically controlled device did not execute the voice command—or regardless of the compliance of the acoustically controlled device.

Step 16 may be followed by step 18 of transmitting (for example by one or more speakers) the ultrasonic command to the acoustically controlled device.

Figure 2:
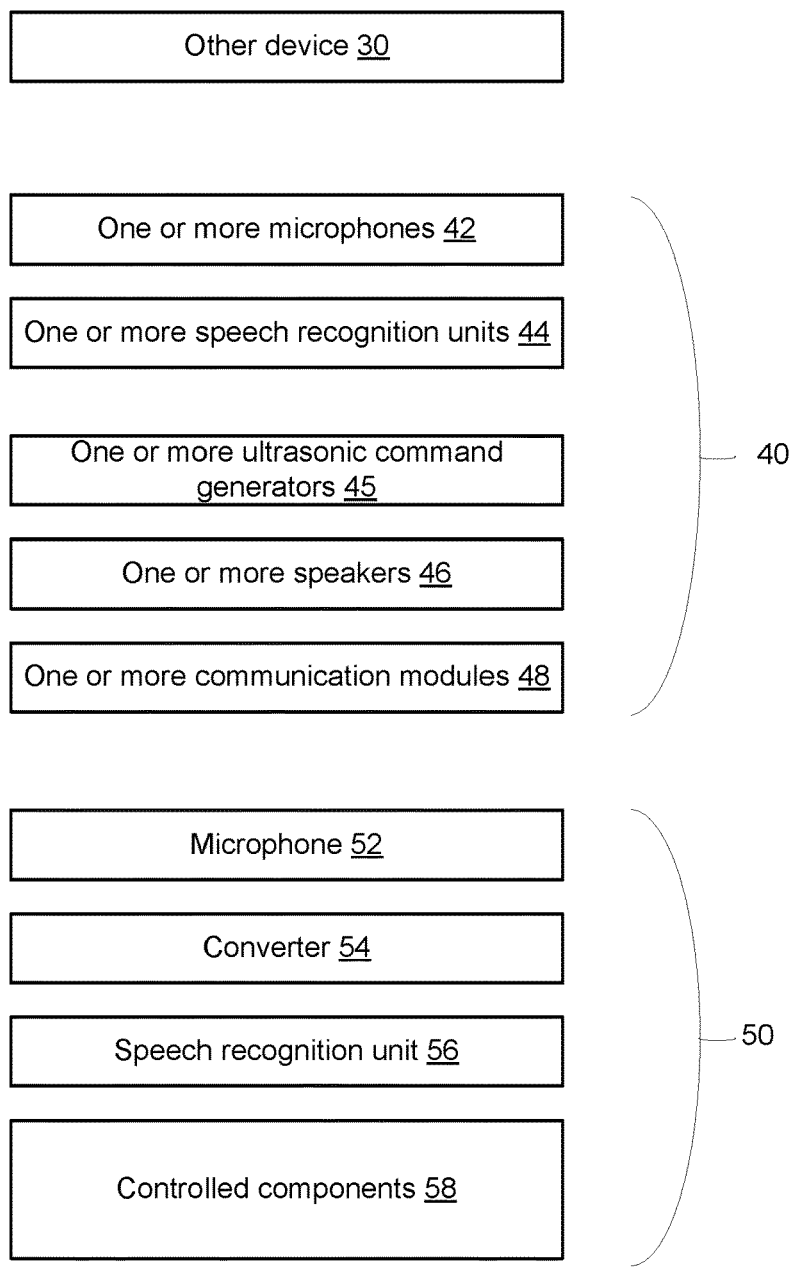
FIG. 2 illustrates a system and a acoustically controlled device according to an embodiment of the invention.

FIG. 2 illustrates the other device 30, system 40 (including components such as one or microphones 42, one or more speech recognition units 44, one or more ultrasonic command generators 45, one or more speakers 46 and one or more communication modules 48) and a acoustically controlled device (including components such as microphone 52, converter 54, speech recognition unit 56 and controlled components 58).

Figure 3:
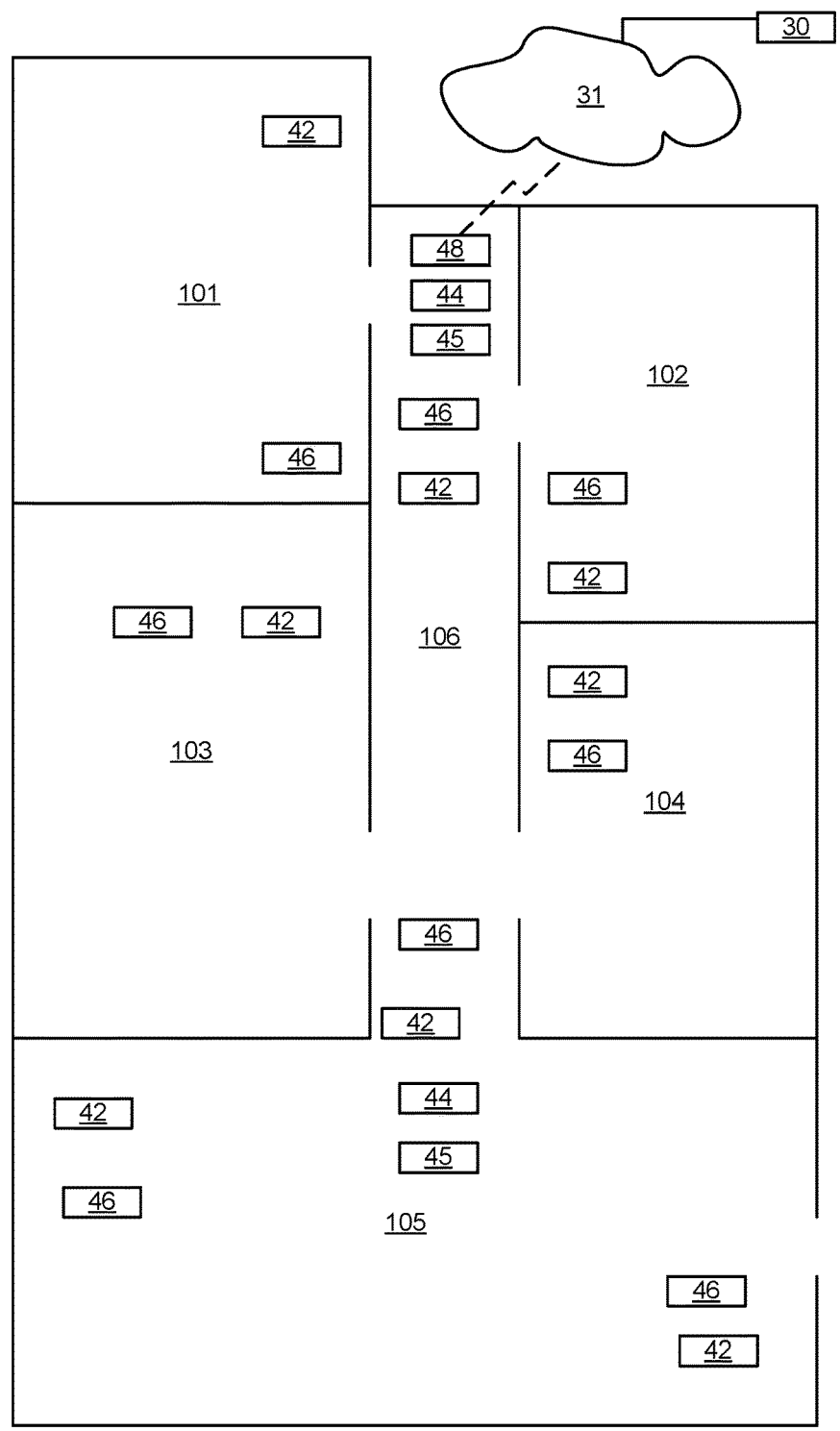
FIG. 3 illustrates a certain environment and various components of the system according to an embodiment of the invention.

FIG. 3 illustrates a certain environment 100 that includes rooms 101, 102, 103, 104, 104 and corridor 106. Microphones 42 and speakers 46 are distributed in the certain environment and may communicate with ultrasonic command generator 45 and speech recognition units 45. For simplicity of explanation only the communication module 48 that communicated with another device 30 via network 31 is shown.

Figure 4:
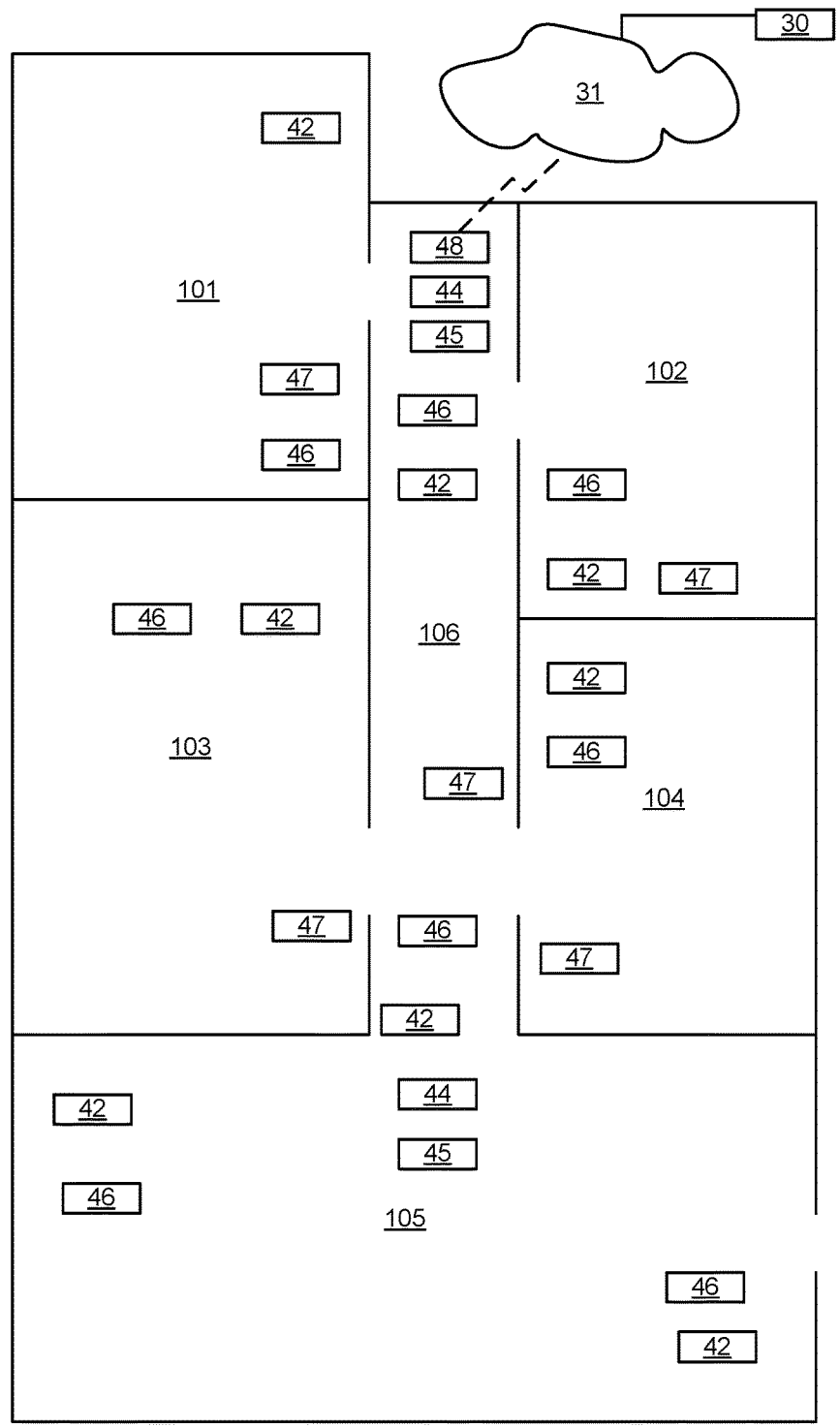
FIG. 4 illustrates a certain environment and various components of the system according to an embodiment of the invention.

FIG. 4 illustrates the certain environment 100 as including other sensors (sensors that differ from the one or more microphones 42)—and are configured to track the compliance of the acoustically controlled device to the voice commands issued by the person. These other sensors 47 may include any combination of image sensors and/or movement sensors—such as image sensors, movement sensors or any other sensors. Any number of other sensors and/or any distribution of the other sensors within the environment may be provided.

Figure 5:
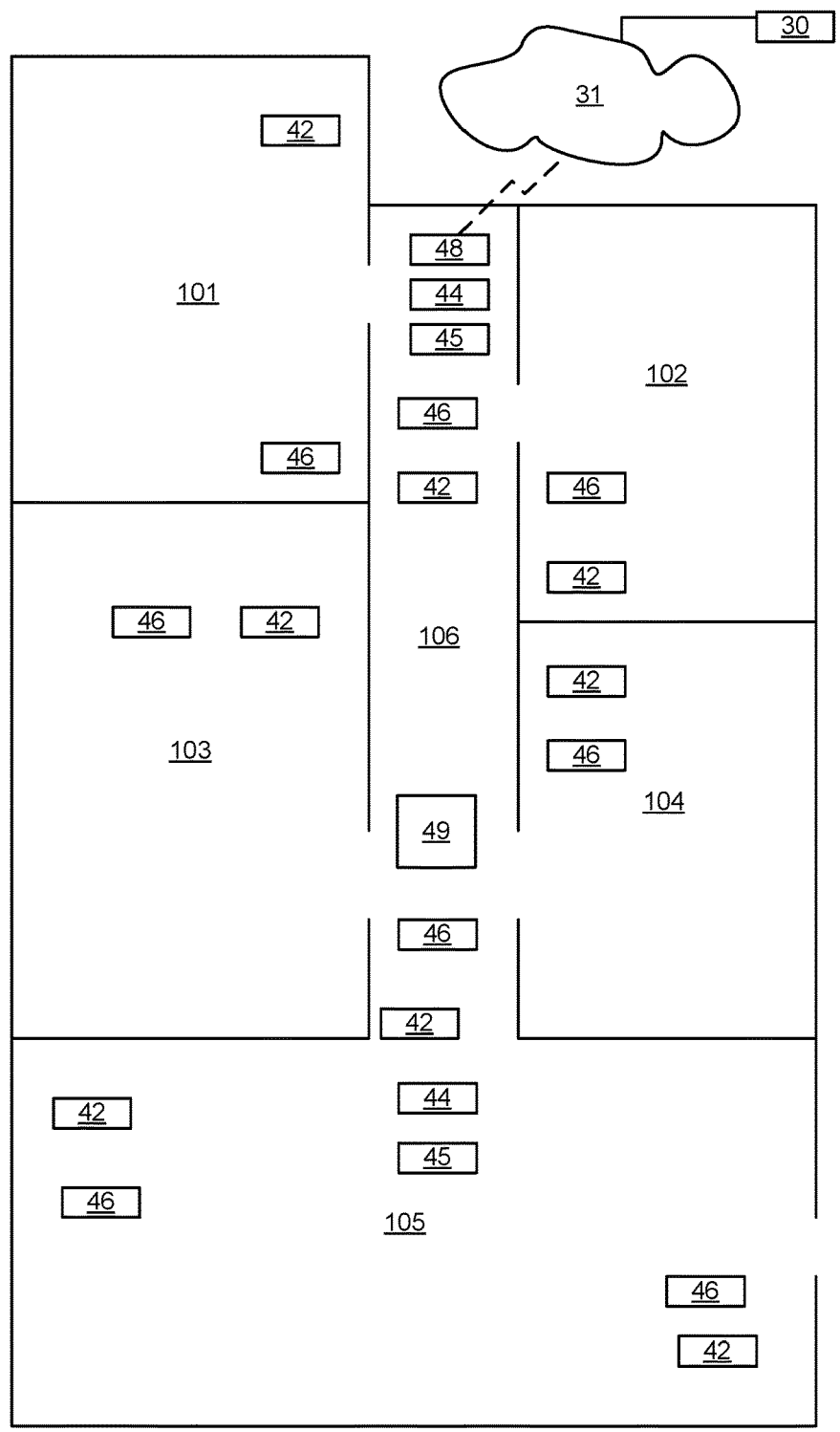
FIG. 5 illustrates a certain environment and various components of the system according to an embodiment of the invention.

FIG. 5 illustrates the certain environment 100 as further including a spectrum analyzer 49 for analyzing the spectrum of noise (actual and/or expected) generated by an acoustically controlled device. The analysis includes (or is followed by) determining the gaps in the noise spectrum—and/or frequency ranges in which the noise generated by the vacuum cleaner are below a certain threshold. The ultrasound command spectrum components in these frequency ranges shall exceed the certain threshold by at least a predefined SNR—for example by at least 3 db.

Figure 6:
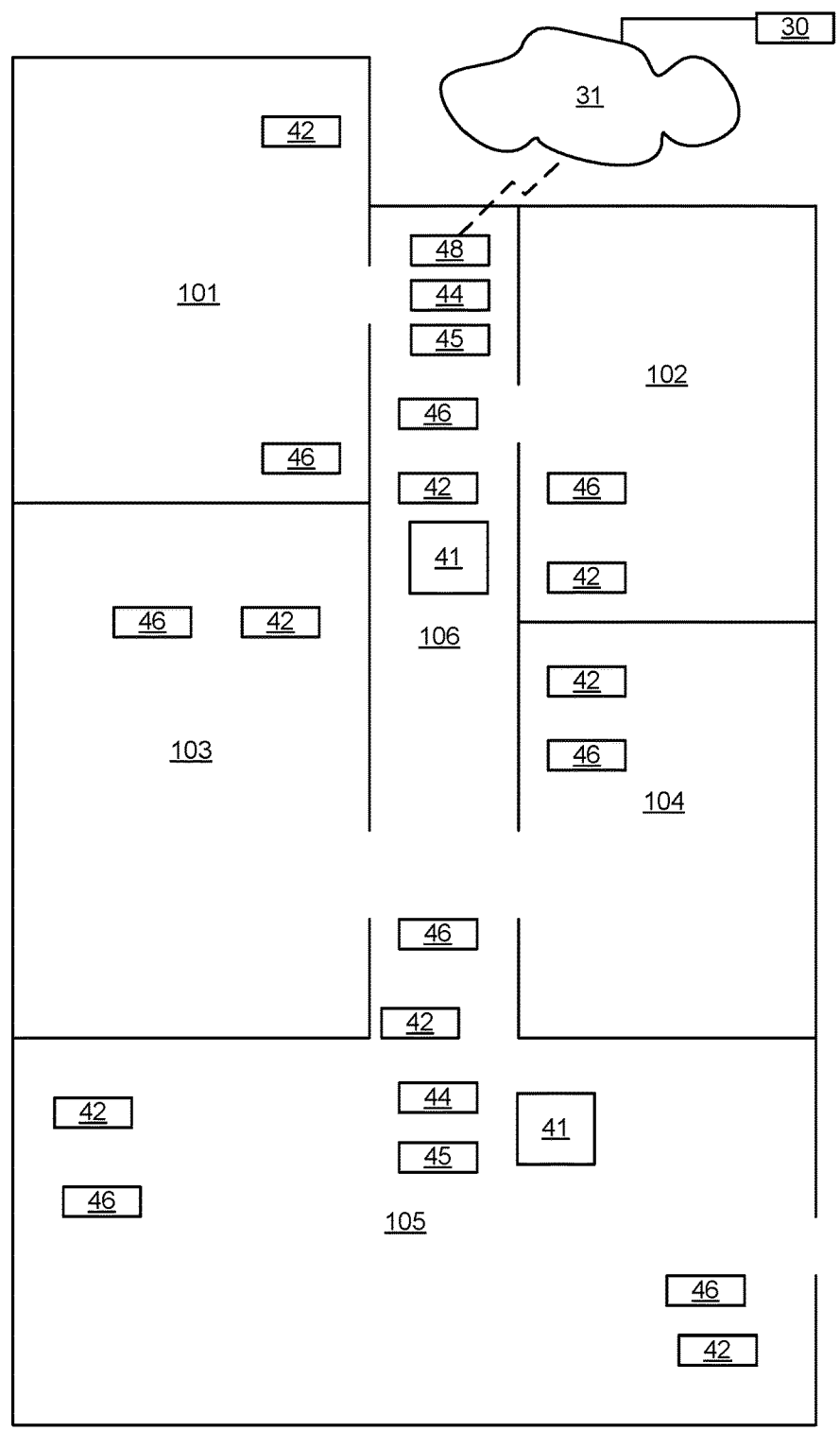
FIG. 6 illustrates a certain environment and various components of the system according to an embodiment of the invention.

FIG. 6 illustrates the certain environment 100 as further including music identifiers 41 for identifying music that is played by an acoustically controlled device 50 that is a speaker or other music playing device. The music identifiers determine the frequency of the ultrasonic command based on the played music—to fit in gaps or frequencies of less spectral content of that music.

Figure 7:
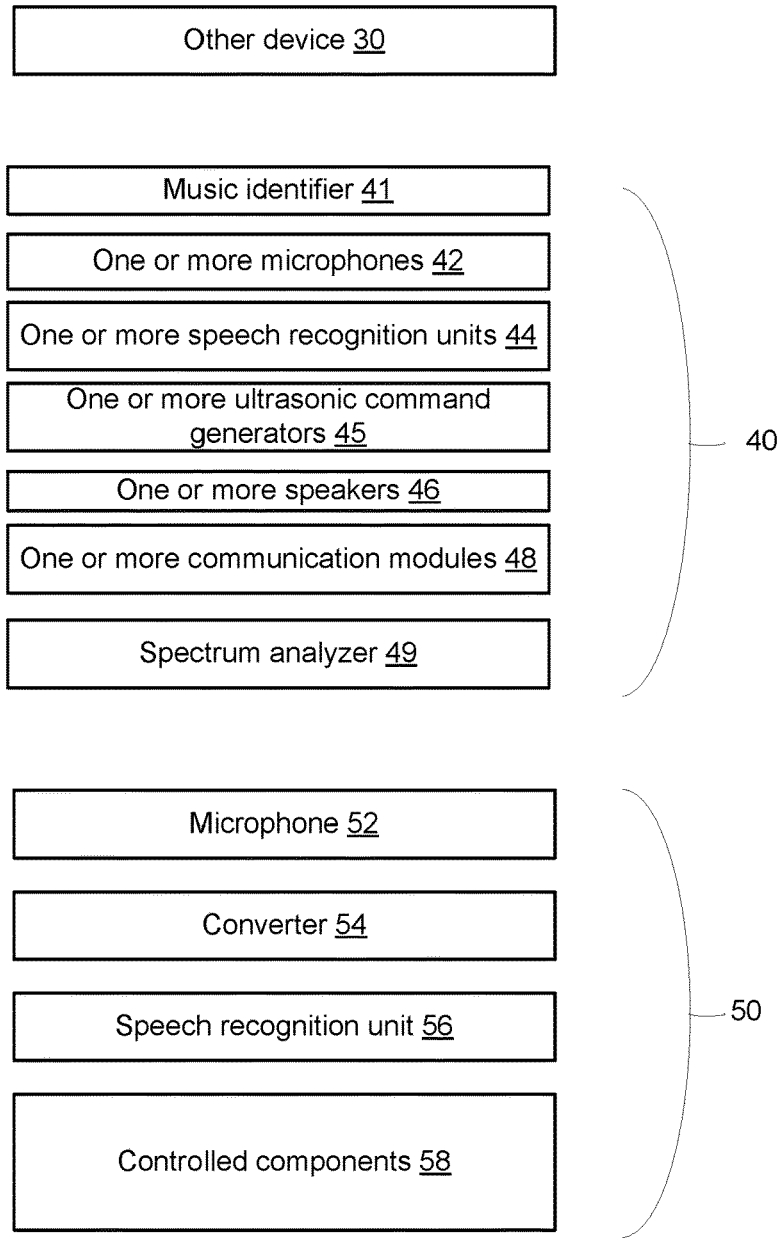
FIG. 7 illustrates a system and an acoustically controlled device according to an embodiment of the invention.

FIG. 7 illustrates the other device 30, system 40 (including components 41, 42, 44, 45, 46, 48 and 49) and an acoustically controlled device (including components 52, 54, 56 and 58).

Figure 8:
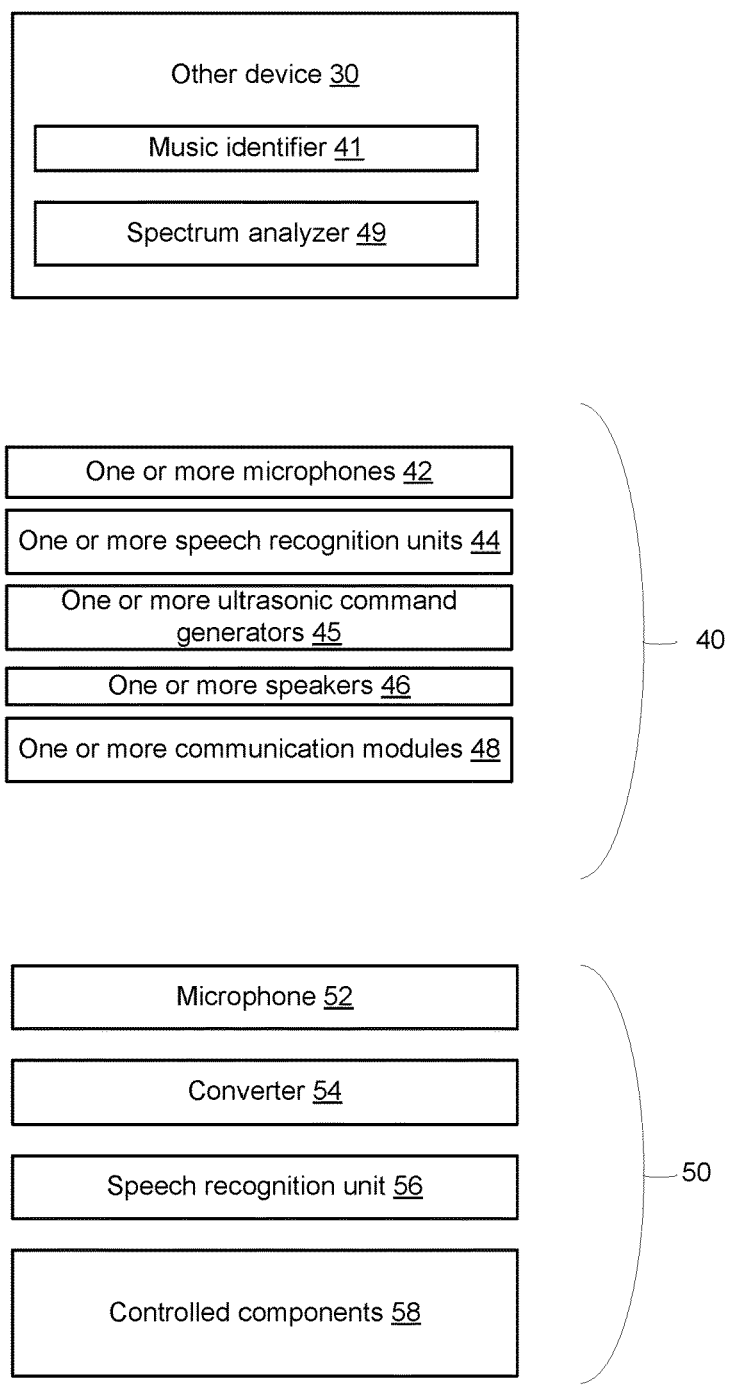
FIG. 8 illustrates a system and an acoustically controlled device according to an embodiment of the invention.
Figure 9:
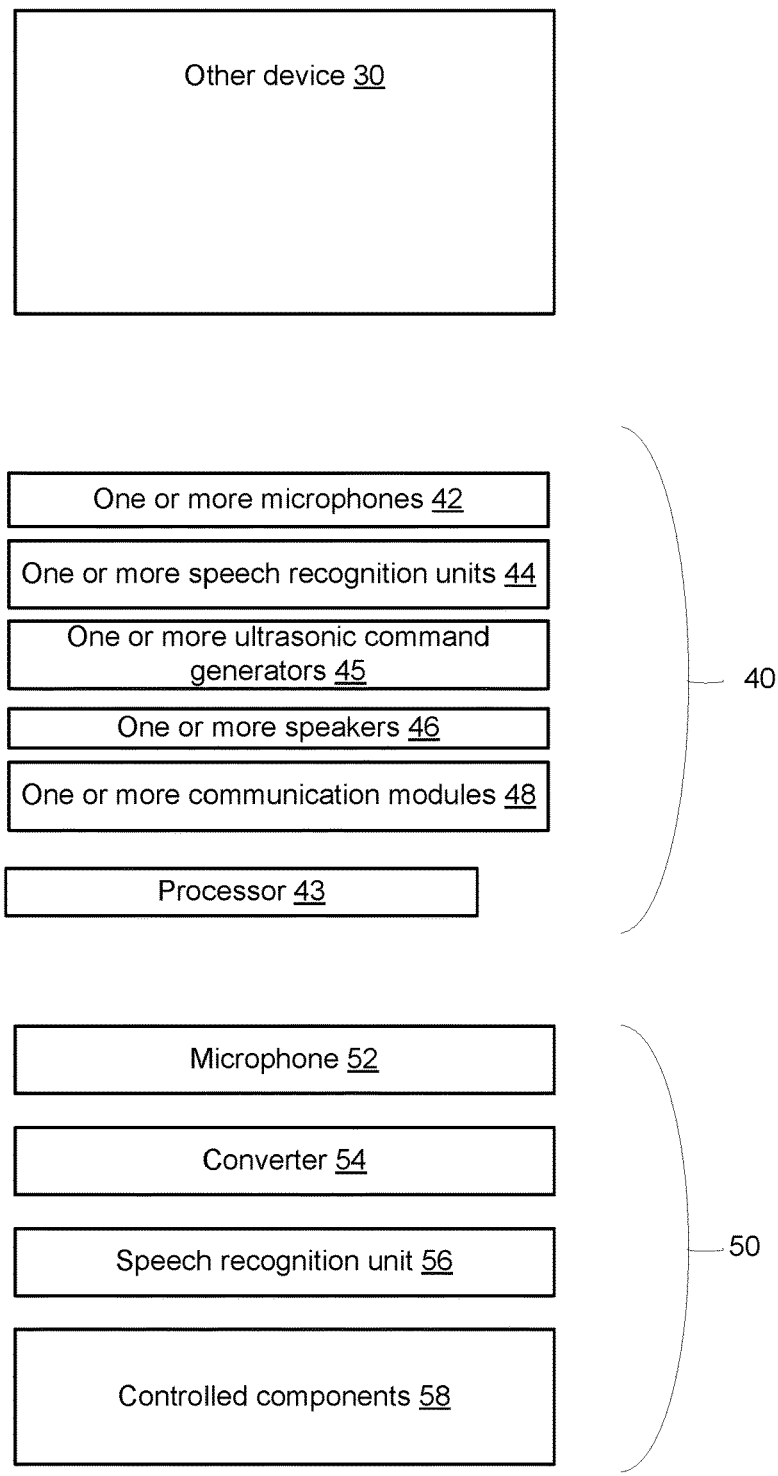
FIG. 9 illustrates a system and an acoustically controlled device according to an embodiment of the invention.

FIG. 8 illustrates the other device 30 (including components 41 and 49), system 40 (including components 42, 44, 45, 46 and 48) and an acoustically controlled device (including components 52, 54, 56 and 58).

FIG. 8 illustrates the other device 30, system 40 (including components 42, 44, 45, 46, 48 and a processor 43) and an acoustically controlled device (including components 52, 54, 56 and 58).

Processor 43 may perform different determination such as determine if the voice command is valid, determine whether to generate an ultrasonic command, determine whether to transmit an ultrasonic command and the like. The processor 43 may be included in components such as speech recognition units 44, one or more ultrasonic command generators and the like. Alternatively—components such as speech recognition units 44, one or more ultrasonic command generators 45 may be implemented by one or more processors.

A processor is a hardware device that may include one or more integrated circuits and may be programmed to execute one or more tasks such as identifying a voice command, generate an ultrasonic command and the like.

Figure 10:
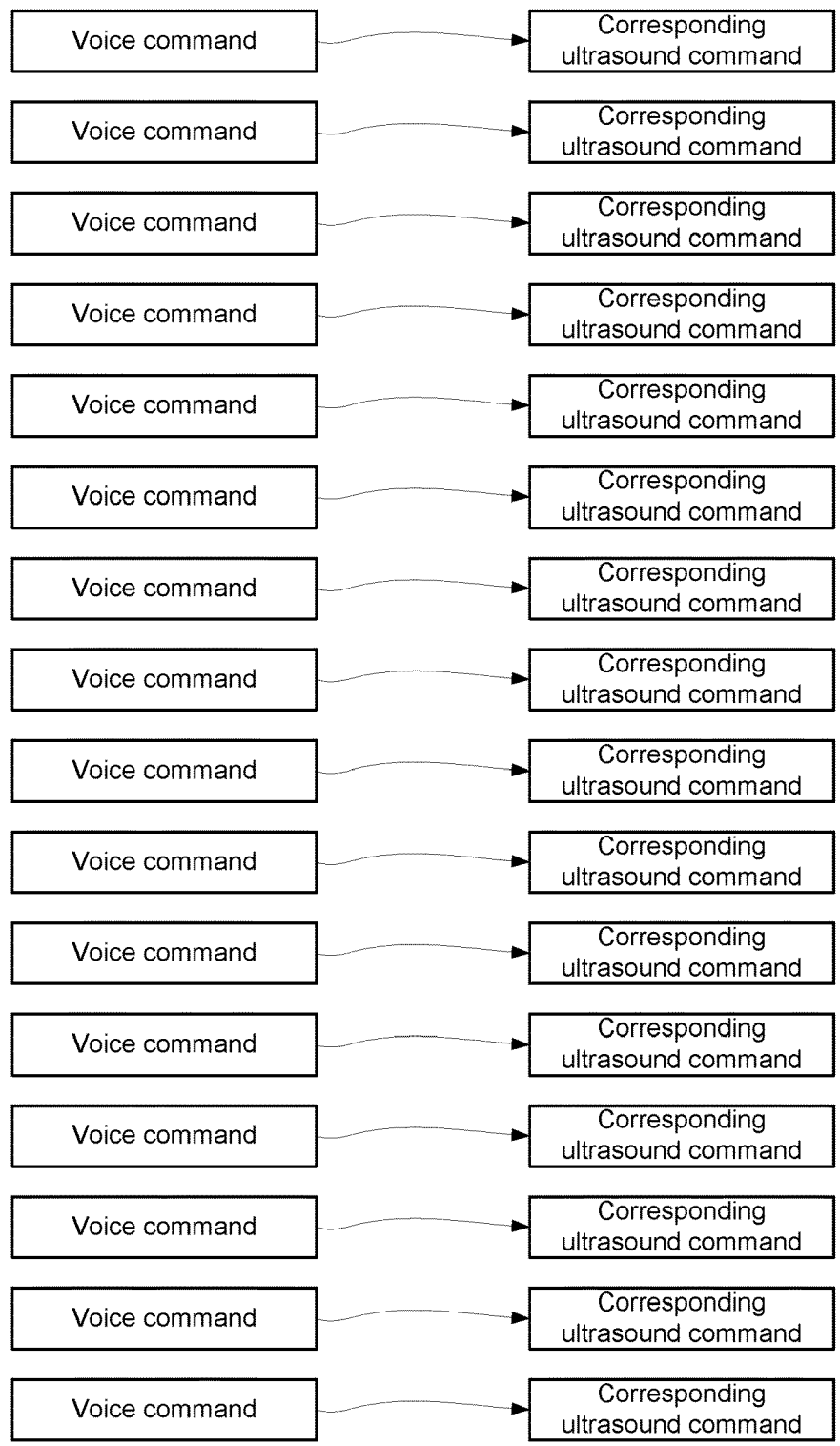
FIG. 10 illustrates a mapping according to an embodiment of the invention.

FIG. 10 illustrates a mapping 101 between voice commands and ultrasonic commands. Each voice command may be mapped to a single ultrasonic command, but this is not necessarily so.

Figure 11:
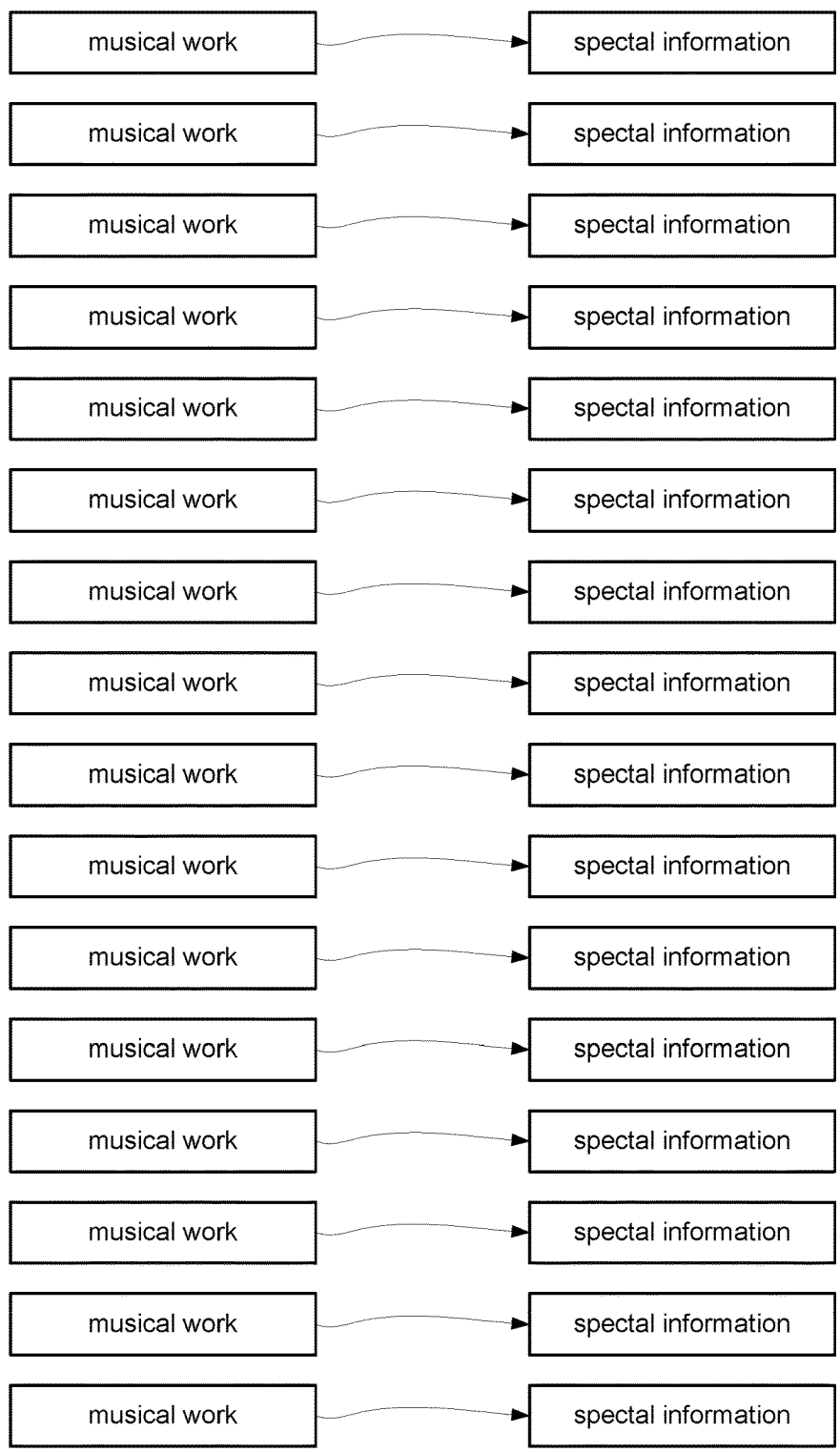
FIG. 11 illustrates a mapping according to an embodiment of the invention.

FIG. 11 illustrates a mapping 102 between musical works (identified by music identifier) and spectral information. The spectral information may identity one or more gaps in the spectrum of the musical work and/or frequencies of less spectral content of the musical work. The frequency information may also include information about the desired minimal intensity of the ultrasonic command to be transmitted in the one or more gaps and/or frequencies of less spectral content.

Figure 12:
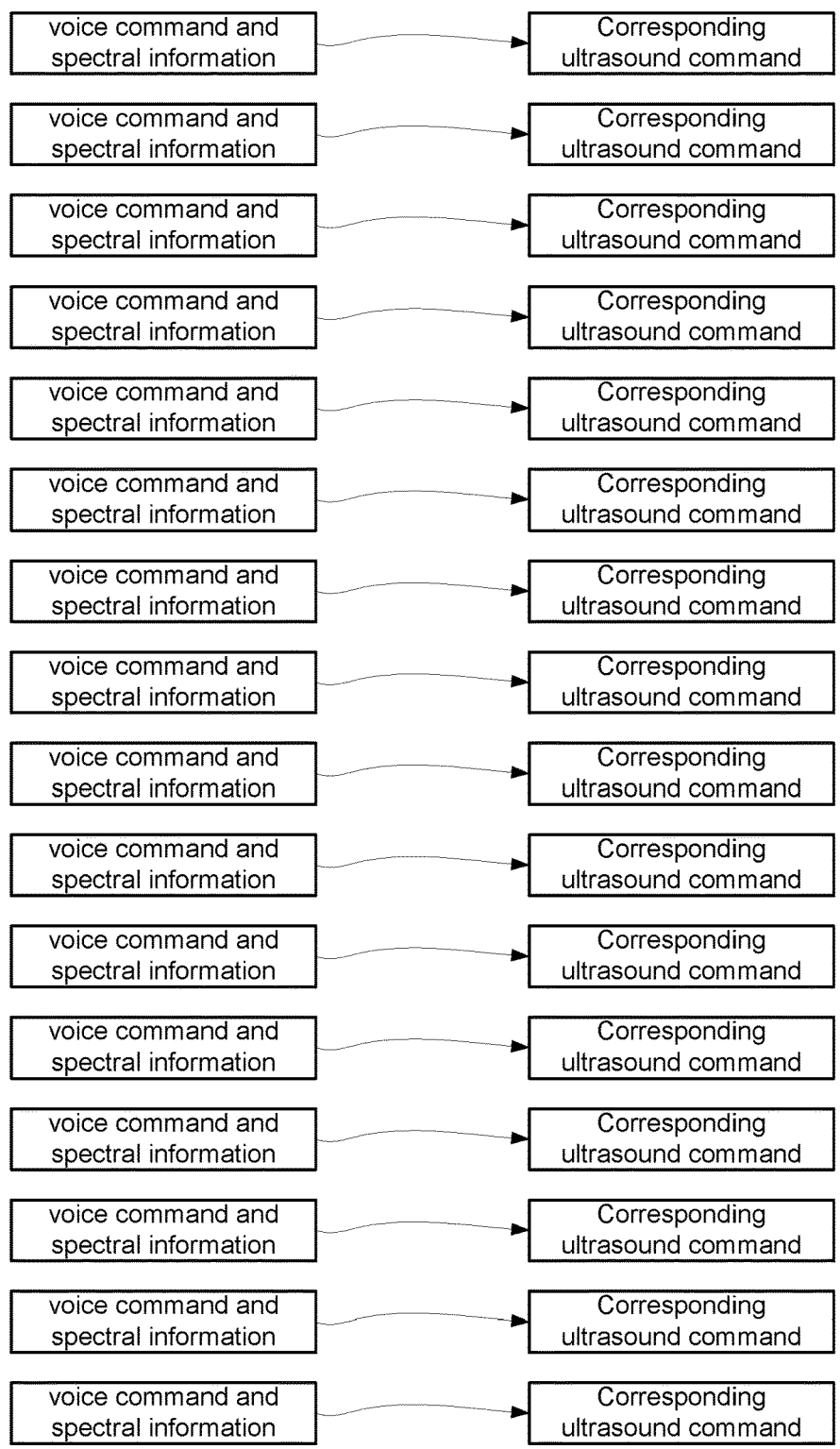
FIG. 12 illustrates a mapping according to an embodiment of the invention.

FIG. 12 illustrates a mapping between (a) commands and frequency information and (b) ultrasonic commands. The frequency information may include the spectrum of noise or any other sound generated by acoustically controlled device and/or information about the spectral response of one or more microphones of the voice controlled device. The corresponding ultrasonic command does not only represent the voice command but may be at the proper frequency and/or intensity/The proper frequency and intensity may be within the frequency response (at least strong enough to be speech recognized by the voice controlled device) of the voice control device and/or within a gap or range of less content of the noise or sound generated by the acoustically controlled device.

Any of the mapping may be stored in a look up table or in any other manner. The mapping may be represented by a mathematical formula.

The mapping may be learnt during a learning period or in any other manner. The frequency information, voice commands and ultrasonic commands may be fed to the other device 50 and/or to system 40.

Figure 13:
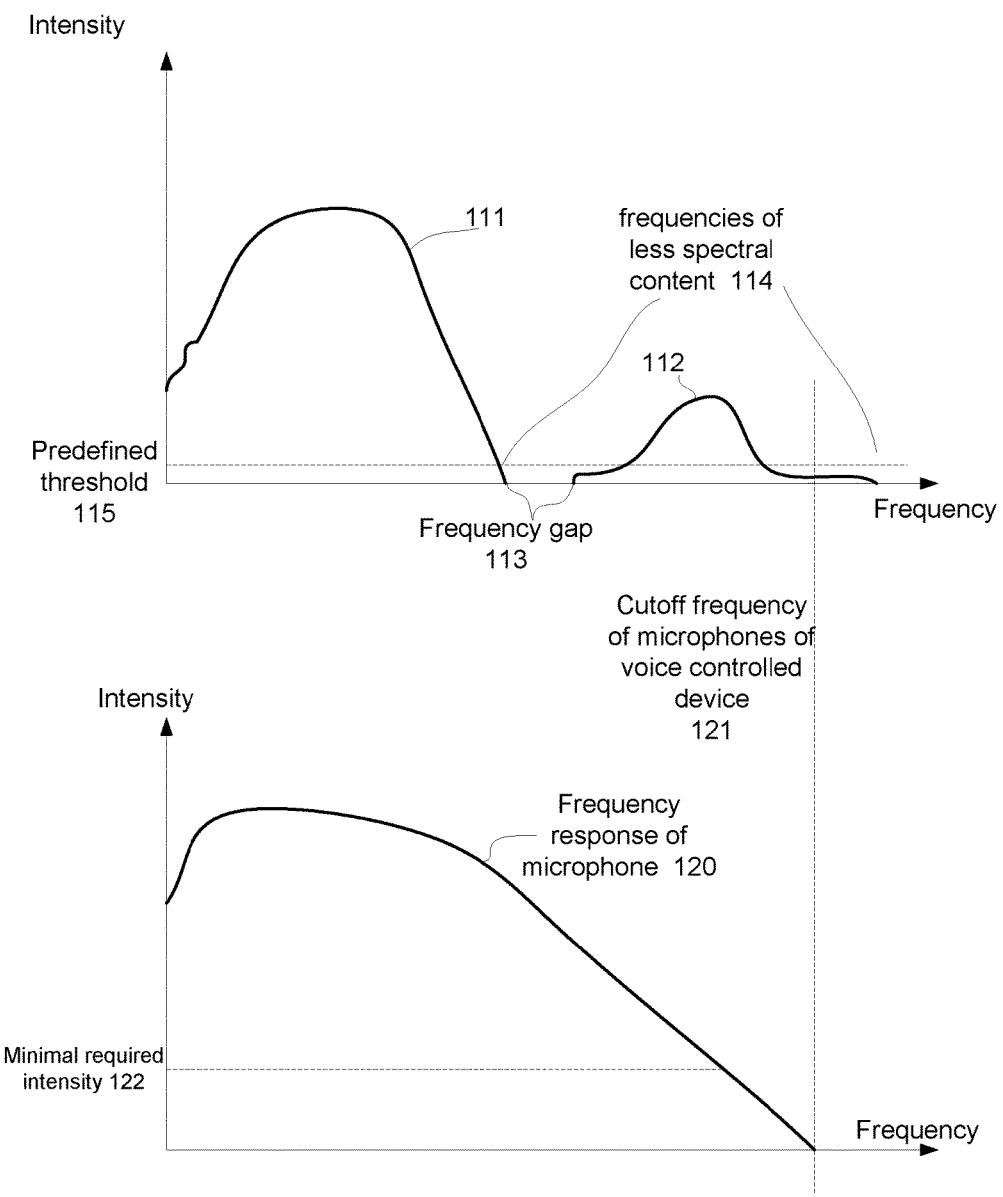
FIG. 13 illustrates spectrums according to an embodiment of the invention.

FIG. 13 is a non-limiting example of a spectrum (111 and 112) of sound generated by the voice control device. Curves 111 and 112 illustrates the spectrum of sound. A gap 113 is defined between curves 111 and 112. FIG. 13 also illustrates a predefined threshold 115 that may define the frequencies 114 of less spectral content 114.

FIG. 13 also illustrates the frequency response 102 of a microphone of the voice controller device and a cutoff frequency 121.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. The integrated circuit may be a system on chip, a general-purpose processor, a signal processor, an FPGA, a neural network integrated circuit, and the like.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system for voice command conversion, the system comprises:
one or more microphones for sensing a voice command for controlling an acoustically controlled device;
one or more speech recognition units for identifying the voice command;
an ultrasonic command generator for generating an ultrasonic command that represents the voice command; and
one or more speakers for transmitting the ultrasonic command to the acoustically controlled device.

2. The system according to claim 1 wherein the one or more microphones, the one or more speech recognition units, the ultrasonic command generator and the one or more speakers are included in an intermediate device that is included in a single housing.

3. The system according to claim 2, comprising one or more sensors for tracking an execution of the voice command by the acoustically controlled device.

4. The system according to claim 3 wherein the one or more sensors differ from the one or more microphones.

5. The system according to claim 3 wherein the one or more sensors comprise at least one image sensor.

6. The system according to claim 3 wherein the one or more sensors comprise at least one movement sensor.

7. The system according to claim 3 wherein the one or more sensors are the one or more microphones.

8. The system according to claim 1 wherein the ultrasonic generator is configured to generate the ultrasonic command, following the identifying of the voice command by the one or more speech recognition units, by searching an ultrasonic command that corresponds to the voice command.

9. The system according to claim 1 wherein the ultrasonic generator is configured to generate the ultrasonic command, following the identifying of the voice command by the one or more speech recognition units, by retrieving from another device the ultrasonic command.

10. The system according to claim 1 wherein the ultrasonic generator is configured to generate the ultrasonic command, following the identifying of the voice command by the one or more speech recognition units, by using a mapping between voice commands and ultrasonic commands.

11. The system according to claim 1, wherein the system is configured to evaluate a validity of the voice command and to generate the ultrasonic command only when determining that the voice command is valid.

12. The system according to claim 11 wherein the system is constructed and arranged to evaluate the validity of the voice command by checking whether the voice command belongs to a set of voice commands associated with the acoustically controlled device.

13. The system according to claim 1, wherein the system is configured to evaluate a validity of the voice command and to generate the ultrasonic command regardless of the validity of the voice command.

14. The system according to claim 1, wherein the system is configured to transmit the ultrasonic command only when the acoustically controlled device did not respond to the voice command.

15. The system according to claim 14 wherein the system is constructed and arranged to determine that the acoustically controlled device did not respond to the voice command by detecting that a person that issued the voice command repeated the voice command several times.

16. The system according to claim 14 wherein the system is constructed and arranged to determine that the acoustically controlled device did not respond to the voice command by detecting a lack of response from the acoustically controlled device.

17. The system according to claim 16 wherein the system is constructed and arranged to detect a lack of response from the acoustically controlled device by sensing noise generated by the acoustically controlled device.

18. The system according to claim 16 wherein the system is constructed and arranged to detect a lack of response from the acoustically controlled device by sensing movement or lack of movement by the acoustically controlled device.

19. The system according to claim 1 comprising one or more spectrum analyzers for finding a gap in a spectrum of an actual noise generated by the acoustically controlled device or an expected noise generated by the acoustically controlled device; and wherein the ultrasonic command generator is configured to select an ultrasonic frequency of ultrasonic command to fall in the gap.

20. The system according to claim 1 comprising one or more spectrum analyzers for finding a gap in a spectrum of an actual noise generated by an environment of the system or an expected noise generated by the environment of the system; and wherein the ultrasonic command generator is configured to select an ultrasonic frequency of ultrasonic command to fall in the gap.

21. The system according to claim 1 comprising one or more spectrum analyzers for finding frequency range in a spectrum of noise generated by the acoustically controlled device in which the noise is below a predefined threshold; and wherein the ultrasonic command generator is configured to select an ultrasonic frequency of ultrasonic command to fall in the frequency range.

22. The system according to claim 1 comprising one or more spectrum analyzers for finding frequency range in a spectrum of noise generated by an environment of the system in which the noise is below a predefined threshold; and wherein the ultrasonic command generator is configured to select an ultrasonic frequency of ultrasonic command to fall in the frequency range.

23. The system according to claim 1 wherein the acoustically controlled device is a speaker and the system comprises a music identifier for identifying music that is played by the speaker and to determine an ultrasonic frequency of the ultrasonic command based on the music played by the speaker to fit in at least one gap or in frequencies of less spectral content of the music played by the speaker.

24. A method for voice command conversion, the method comprises:
- sensing, by one or more microphones, a voice command for controlling an acoustically controlled device;
- identifying, by one or more speech recognition units, the voice command;
- generating, by an ultrasonic command generator, an ultrasonic command that represents the voice command; and
- transmitting, by one or more speakers, the ultrasonic command to the acoustically controlled device.

25. The method according to claim 24 wherein the one or more microphones, the one or more speech recognition units, the ultrasonic command generator and the one or more speakers are included in an intermediate device that is included in a single housing.

26. The method according to claim 25 comprising tracking an execution of the voice command by the acoustically controlled device.

27. The method according to claim 25 comprising determining that the acoustically controlled device did not respond to the voice command by detecting that a person that issued the voice command repeated the voice command several times.

28. The method according to claim 25 comprising determining that the acoustically controlled device did not respond to the voice command by detecting a lack of response from the acoustically controlled device.

29. The method according to claim 24, comprising evaluating a validity of the voice command and generating the ultrasonic command only when determining that the voice command is valid.

30. The method according to claim 29 wherein the evaluating of the validity of the voice command comprises checking whether the voice command belongs to a set of voice commands associated with the acoustically controlled device.

31. The method according to claim 24 wherein the acoustically controlled device is a speaker, wherein the method comprises identifying, by a music identifier, music that is played by the speaker; and determining an ultrasonic frequency of the ultrasonic command based on the music played by the speaker to fit in at least one gap or in frequencies of less spectral content of the music played by the speaker.

32. The method according to claim 24, wherein the method is executed by a system, wherein the method comprises finding, by one or more spectrum analyzers, a gap in a spectrum; and selecting, by the ultrasonic command generator, an ultrasonic frequency of ultrasonic command to fall in the gap; and wherein the spectrum is selected out of: (a) a spectrum of an actual noise generated by the acoustically controlled device, (b) a spectrum of an expected noise generated by the acoustically controlled device, (c) a spectrum of an actual noise generated by an environment of the system; (d) a spectrum of or an expected noise generated by the environment of the system; (e) in a spectrum of noise generated by the acoustically controlled device in which the noise is below a predefined threshold, (f) a spectrum of noise generated by an environment of the system in which the noise is below a predefined threshold.

* * * * *